(12) United States Patent
Yamaguchi et al.

(10) Patent No.: US 6,395,368 B1
(45) Date of Patent: *May 28, 2002

(54) GLASS-CERAMIC SUBSTRATE FOR A MAGNETIC INFORMATION STORAGE MEDIUM

(75) Inventors: Katsuhiko Yamaguchi; Naoyuki Goto, both of Sagamihara (JP)

(73) Assignee: Kabushiki Kaisha Ohara, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/366,578

(22) Filed: Aug. 4, 1999

(30) Foreign Application Priority Data

Aug. 10, 1998 (JP) .......................................... 10-225743

(51) Int. Cl.$^7$ ................................................. G11B 5/82
(52) U.S. Cl. ................ 428/65.3; 428/141; 428/694 ST; 428/694 SG; 428/426; 428/900; 360/135; 501/4
(58) Field of Search ................................ 428/65.3, 141, 428/694 ST, 694 SG, 426, 900; 360/135; 501/4

(56) References Cited

U.S. PATENT DOCUMENTS

| | | | | |
|---|---|---|---|---|
| 5,744,208 A | * | 4/1998 | Beall et al. | 428/64.1 |
| 5,804,520 A | * | 9/1998 | Morinaga et al. | 501/4 |
| 5,866,489 A | * | 2/1999 | Yamaguchi et al. | 501/4 |
| 6,120,922 A | * | 9/2000 | Goto | 428/694 ST |
| 6,124,223 A | * | 9/2000 | Beall et al. | 501/4 |

FOREIGN PATENT DOCUMENTS

| | | |
|---|---|---|
| EP | 0 875 886 A | 11/1998 |
| EP | 0 945 855 A | 9/1999 |
| EP | 0 945 856 A | 9/1999 |
| JP | 10 203847 | 8/1998 |

OTHER PUBLICATIONS

European Search Report.

* cited by examiner

Primary Examiner—Stevan A. Resan
(74) Attorney, Agent, or Firm—Hedman & Costigan, P.C.

(57) ABSTRACT

A glass-ceramic substrate for a magnetic information storage medium having a super flat surface comprises, as a predominant phase or phases, at least one crystal phase selected from the group consisting of lithium disilicate ($Li_2O \cdot 2SiO_2$, having an interplaner spacing of maximum peak intensity measured by an X-ray diffraction analysis within a range from 3.57 Å and 3.62 Å), quartz ($SiO_2$, having an interplaner spacing of maximum peak intensity measured by an X-ray diffraction analysis within a range from 3.33 Å to 3.41 Å), quartz solid solution ($SiO_2$ solid solution, having an interplaner spacing of maximum peak intensity measured by an X-ray diffraction analysis within a range from 3.33 Å to 3.41 Å), cristobalite ($SiO_2$, having an interplaner spacing of maximum peak intensity measured by an X-ray diffraction analysis within a range from 4.04 Å to 4.14 Å) and cristobalite solid solution ($SiO_2$ solid solution, having an interplaner spacing of maximum peak intensity measured by an X-ray diffraction analysis within a range from 4.04 Å to 4.14 Å), has a coefficient of thermal expansion within a range from $+62 \times 10^{-7}$/° C. to $+130 \times 10^{-7}$/° C. in a temperature range from $-50°$ C. to $+70°$ C., has Young's modulus within a range from 80 GPa to 150 GPa, has Vickers hardness within a range from 4.5 GPa to 15.0 GPa, has a specific gravity within a range from 2.2 to 2.8, has a surface roughness (Ra) after polishing within a range from 3 Å to 9 Å and contains $Al_2O_3$ in the amount of 2% to less than 10%.

6 Claims, 5 Drawing Sheets

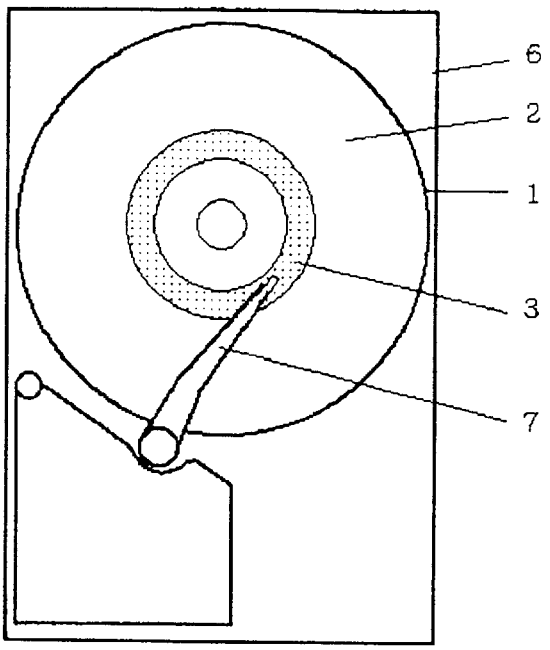
F I G. 10
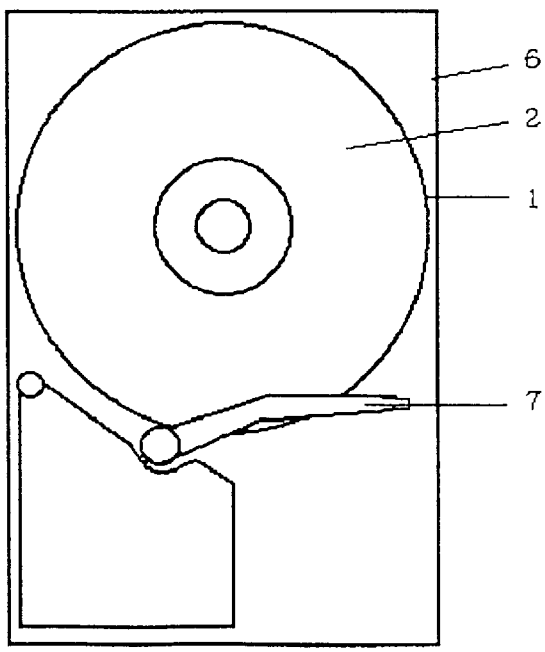
F I G. 11

GLASS-CERAMIC SUBSTRATE FOR A MAGNETIC INFORMATION STORAGE MEDIUM

TITLE OF THE INVENTION

Glass-ceramic substrate for a magnetic information storage medium

BACKGROUND OF THE INVENTION

This invention relates to a glass-ceramic substrate for a magnetic information storage medium and, more particularly, to a glass-ceramic substrate for a magnetic information storage medium such as a magnetic disk made of a glass-ceramic having super flatness of a surface of the substrate suitable for use in the near contact recording system or the contact recording system. The invention relates also to a magnetic information storage medium using this glass-ceramic substrate. In this specification, the term "magnetic information storage medium" means a magnetic information storage medium in the form of a disk and includes fixed type hard disks, removable type hard disks and card type hard disks used respectively for so-called "hard disks" for personal computers and storage of information in a network and other information storage medium in the form of a disk which can be used for storage of data in, e.g., digital video cameras and digital cameras.

Recent development of personal computers for multimedia purposes and digital video cameras and digital cameras which requires handling of a large amount of data such as moving pictures and voice has increased a demand for a magnetic information storage device of a higher recording capacity. As a result, for increasing the recording density, it is necessary in a magnetic information storage medium to increase its bit and track density and reduce the size of a bit cell. In conformity with the reduction in the size of the bit cell, a magnetic head performs its operation in closer proximity to the surface of a disk. Thus, as the magnetic head performs its operation in a near-contact state or contact state against the disk surface, it becomes important that a substrate has a super flat surface.

As described above, the magnetic head is operated in a near contact state or a contact state and the surface characteristic of the magnetic information storage medium is required to have an increased flatness compared to the conventional medium. Further, in addition to the conventional fixed type hard disks, information storage media such as removable type hard disks and card type hard disks have been proposed and put into practice and application of digital video cameras and digital cameras for various uses have been started.

Known in the art of magnetic disk substrate materials is aluminum alloy. The aluminum alloy substrate, however, has projections or spot-like projections and depressions on the substrate surface during polishing due to various defects of the material and, therefore, is not sufficient as a substrate for a high recording density storage medium in flatness and smoothness. Besides, since aluminum alloy is a soft material, deformation of the medium tends to take place. Difficulty also arises in making the magnetic information storage medium thinner. Further, damage of the medium by contact with a head is liable to occur. Thus, the aluminum alloy substrate cannot sufficiently cope with the current requirements for a high-speed recording.

As materials for overcoming the above problems of the aluminum alloy substrate, known in the art are chemically tempered glasses such as soda-lime glass ($SiO_2$—CaO—$Na_2O$) and alumino-silicate glass ($SiO_2$—$Al_2O_3$—$Na_2O$). These materials, however, have the following disadvantages: (1) Since polishing is made after the chemical tempering process, the chemically tempered layer is seriously instable in making the disk thinner. (2) For improving the contact-start-stop (CSS) characteristic, the substrate is textured to form projections or depressions on the surface. Since a mechanical or thermal (i.e., laser irradiation) processing causes cracking due to distortion in the chemically tempered layer, the chemical etching or film forming grain boundary growth method needs to be employed with resulting difficulty in producing the product in a stable manner at a low cost. (3) Since the glass contains $Na_2O$ as an essential ingredient, the glass has the problem that the film forming characteristics of the medium is deteriorated and, for preventing diffusion of $Na_2O$, it becomes necessary to apply a barrier coating over the entire surface of the substrate. This prevents stable production of the product at a competitive cost.

Aside from the aluminum alloy substrate and chemically tempered glass substrate, known in the art are some glass-ceramic substrates. For example, the glass-ceramics of a $SiO_2$—$Li_2O$—MgO—$P_2O_5$ system disclosed in Japanese Patent Application Laid-open Publication No. Hei 6-329440 containing lithium disilicate ($Li_2O.2SiO_2$) and $\alpha$-quartz ($\alpha$-$SiO_2$) as main crystal phases is an excellent material as a material textured over the entire surface in which, by controlling the grain diameter of globular crystal grains of $\alpha$-quartz, the conventional mechanical texturing or chemical texturing can be omitted and the surface roughness after polishing (Ra) can be controlled within a range from 15 Å to 50 Å. This prior art glass-ceramic, however, cannot sufficiently cope with the requirement for the low glide height necessitated by the rapidly increasing recording density which requires an extremely small surface roughness (Ra) of 3 Å to 9 Å, Further, no discussion or suggestion has been made in the patent about the landing zone which will be described later in this specification. Japanese Patent Application Laid-open Publication No. Hei 7-169048 discloses a photo-sensitive glass-ceramic of a $SiO_2$—$Li_2O$ system containing Au and Ag which are photo-sensitive metals characterized by forming a data zone and a landing zone on the surface of the substrate for the magnetic disk. The predominant crystal phase of this glass-ceramic consists of lithium silicate ($Li_2O.SiO_2$) and/or lithium disilicate ($Li_2O.2SiO_2$). Lithium silicate however generally has a poor chemical durability which causes a problem in putting this glass-ceramic to a practical use. Further, in forming the landing zone, a part of the substrate (i.e., landing zone) is crystallized and is subjected to chemical etching by the HF 6% solution. It however increases thermal and mechanical instability to afford an uncrystallized portion and a crystallized portion to the disk substrate. Besides, in performing the chemical etching by the HF solution, control of concentration of the HF etching is difficult due to evaporation of the HF solution with the result that the glass-ceramic is not suitable for a large scale production.

Japanese Patent Application Laid-open Publication No. Hei 9-35234 discloses a magnetic disk substrate made of a glass-ceramic of a $SiO_2$—$Al_2O_3$—$Li_2O$ system having predominant crystal phases of lithium disilicate ($Li_2O. 2SiO_2$) and $\beta$-spodumene ($Li_2O.Al_2O_3.4SiO_2$). This glass-ceramic, however, contains, as its predominant crystal phase, $\beta$-spodumene which has a negative thermal expansion characteristic which causes the substrate to have a negative thermal expansion characteristic and, in this glass-ceramic, growth of $SiO_2$ crystals such as $\alpha$-quartz ($\alpha$-$SiO_2$) and α-cristobalite (α-$SiO_2$) which have a positive thermal expansion characteristic and thereby cause the substrate to have a positive thermal expansion characteristic is extremely restricted. The arithmetic mean surface roughness of this glass-ceramic after polishing is defined as 20 Å or below but the arithmetic mean surface roughness disclosed in examples is a rough one of 12 Å–17 Å which fails to reach the above described desired surface roughness and, therefore, this glass-ceramic cannot cope sufficiently with the requirement for the low glide height of a magnetic head. Besides, the material which grows a crystal having a negative thermal expansion characteristic as a predominant crystal phase apparently adversely affects the substrate in difference in the coefficient of thermal expansion with respect to component parts of a drive device. Further, since this glass-ceramic requires a high temperature of 820° C. to 920° C. for crystallization which prevents a large scale production of the product at a competitive cost.

International Publication WO97/01164 which includes the above described Japanese Patent Application Laid-open Publication No. Hei 9-35234 discloses a glass-ceramic for a magnetic disk in which temperature for crystallization is reduced (680° C.–770°C.). A sufficient improvement however cannot be achieved in this substrate. Besides, crystals grown in all examples disclosed are β-eucryptite ($Li_2O.Al_2O_3.2SiO_2$) which has a negative thermal expansion characteristic and this adversely affects difference in the coefficient of thermal expansion with respect to component parts of a drive device. Further, as a feature of these publications, they do not substantially comprise MgO.

It is, therefore, an object of the invention to eliminate the above described disadvantages of the prior art and provide a glass-ceramic substrate for a magnetic information storage medium having an excellent flat surface characteristic capable of coping with recording at a low glide height or contact recording of a magnetic head necessitated by increase in the recording capacity of a magnetic information storage medium.

It is another object of the invention to provide a magnetic information storage medium having a film of a magnetic medium formed on this glass-ceramic substrate.

SUMMARY OF THE INVENTION

Accumulated studies and experiments made by the inventors of the present invention for achieving the above described objects of the invention have resulted in the finding, which has led to the present invention, that a glass-ceramic which is obtained by heat treating within a limited range a $SiO_2$—$Li_2O$—$K_2O$—MgO—ZnO—$P_2O_5$—$Al_2O_3$—$ZrO_2$ system glass contains, as its predominant crystal phase or phases, at least one crystal phase selected from the group consisting of lithium disilicate ($Li_2O.2SiO_2$), quartz ($SiO_2$), quartz solid solution ($SiO_2$ solid solution), cristobalite ($SiO_2$) and cristobalite solid solution ($SiO_2$ solid solution), has crystal grains of the predominant crystal phase or phases which are fine and substantially of a globular shape, and has an excellent super-flat surface characteristic after polishing.

For achieving the above described object of the invention, there is provided a glass-ceramic substrate for a magnetic information storage medium comprising, as a predominant phase or phases, at least one crystal phase selected from the group consisting of lithium disilicate ($Li_2O.2SiO_2$, having an interplaner spacing of maximum peak intensity measured by an X-ray diffraction analysis within a range from 3.57 Å and 3.62 Å), quartz ($SiO_2$, having an interplaner spacing of maximum peak intensity measured by an X-ray diffraction analysis within a range from 3.33 Å to 3.41 Å), quartz solid solution ($SiO_2$ solid solution, having an interplaner spacing of maximum peak intensity measured by an X-ray diffraction analysis within a range from 3.33 Å to 3.41 Å), cristobalite ($SiO_2$, having an interplaner spacing of maximum peak intensity measured by an X-ray diffraction analysis within a range from 4.04 Å to 4.14 Å) and cristobalite solid solution ($SiO_2$ solid solution, having an interplaner spacing of maximum peak intensity measured by an X-ray diffraction analysis within a range from 4.04 Å to 4.14 Å), has a coefficient of thermal expansion within a range from +62×10$^{-7}$/° C. to +130×10$^{-7}$/° C. in a temperature range from −50° C. to +70° C., has Young's modulus within a range from 80 GPa to 150 GPa, has Vickers hardness within a range from 4.5 GPa to 15.0 GPa, has a specific gravity within a range from 2.2 to 2.8, has a surface roughness (Ra) after polishing within a range from 3 Å to 9 Å and contains $Al_2O_3$ in the amount of 2% to less than 10%.

In one aspect of the invention, the glass-ceramic substrate is substantially free of $Na_2O$ and PbO.

In another aspect of the invention, there is provided a glass-ceramic substrate wherein crystal grain diameter of lithium disilicate is within a range from 0.05 μm to 0.30 μm, crystal grain diameter of quartz and quartz solid solution is within a range from 0.10 μm to 1.00 μm and crystal grain diameter of cristobalite and cristobalite solid solution is within a range from 0.10 μm and 0.501 μm.

In another aspect of the invention, the glass-ceramic substrate comprises in weight percent:

| | |
|---|---|
| $SiO_2$ | 70–80% |
| $Li_2O$ | 9–12% |
| $K_2O$ | 2–5% |
| MgO + ZnO | 0–5% |
| in which MgO | 0–5% |
| ZnO | 0–3% |
| $P_2O_5$ | 1.5–3% |
| $ZrO_2$ | 0.5–5% |
| $Al_2O_3$ | 2–less than 10% |
| $Sb_2O_3 + As_2O_3$ | 0–2%. |

In another aspect of the invention, the glass-ceramic substrate is obtained by heat treating a base glass for nucleation under a temperature within a range from 450° C. to 550° C. for one to twelve hours and further heat treating the glass for crystallization under a temperature within a range from 680° C. to 800° C. for one to twelve hours and thereafter polishing the glass-ceramic to a surface roughness (Ra) within a range from 3 Å to 9 Å.

In another aspect of the invention, there is provided a magnetic information storage medium provided by forming a magnetic film and, if necessary, other layers including an undercoat layer, a protective layer and a lubricating layer, on the above described glass-ceramic substrate.

BRIEF DESCRIPTION OF THE DRAWINGS

In the accompanying drawings,

FIG. 10 is a view showing a magnetic information storage device using a landing system in which start and stop of the magnetic head are performed in the landing zone; and FIG. 11 is a view showing a magnetic information storage device using a ramp loading system in which start and stop of the magnetic head are performed in an area outside of the substrate.

DETAILED DESCRIPTION OF THE INVENTION

Figure 1:
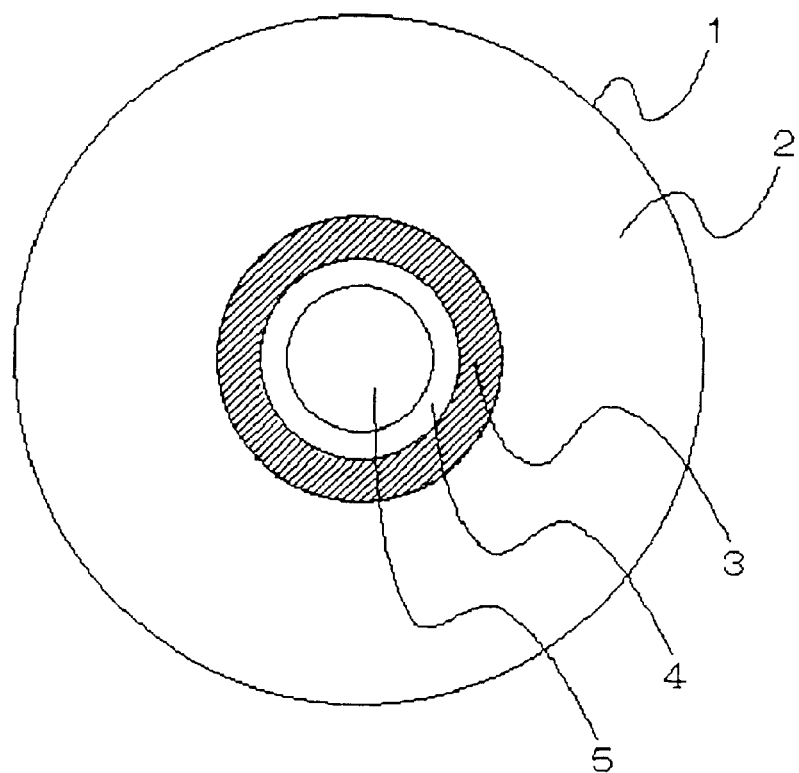
FIG. 1 is a top plan view of the state of a landing zone formed outside of a central opening and a data zone formed adjacent to the outer periphery of the landing zone of a glass-ceramic substrate for a magnetic information storage medium according to the invention.

Reasons for limiting the predominant crystal phases, crystal grain diameter, shape of crystal grains, coefficient of thermal expansion, surface characteristics, composition and conditions of heat treatment will now be described. The composition of the glass-ceramic is expressed on the basis of composition of oxides as in their base glass.

Description will be made first about predominant crystal phases.

The glass-ceramic substrate according to the invention should preferably contain, as a predominant crystal phase or phases, at least one crystal phase selected from the group consisting of lithium disilicate ($Li_2O \cdot 2SiO_2$), quartz ($SiO_2$), quartz solid solution ($SiO_2$ solid solution), cristobalite ($SiO_2$) and cristobalite solid solution ($SiO_2$ solid solution). It has been found that the predominant crystal phase is an important factor which determines a coefficient of thermal expansion, mechanical strength and the surface characteristic which are influenced by shape of crystal grains and that, for realizing these properties required for a substrate coping with the high recording density, the above described crystal phase or phases must be contained as the predominant crystal phase or phases. There is no limitation as to the type of these crystals, i.e., α type or β type, because the required properties of the glass-ceramic can be satisfied as a whole by suitably controlling the grown crystals.

In the glass-ceramics, the crystal is grown in the base glass and is influenced by the ambient glass and other crystals. Hence the X-ray diffraction peak sometimes shifts to some extent and, for this reason, the interplaner spacing is defined in the claim to accurately specify the predominant crystal phase.

Description will now be made about a coefficient of thermal expansion. As the recording density increases, positioning of the magnetic head relative to the information storage medium requires a high precision and, therefore, a high accuracy of dimension is required for the substrate and respective component parts for the medium. Therefore, an influence of difference in the coefficient of thermal expansion between the substrate and the component parts for the medium cannot be ignored and difference in the coefficient of thermal expansion must be reduced to the maximum extent possible. However, each manufacturer of a magnetic information storage device has its own standard in selecting component parts. For this reason, in the crystal system of the present invention, a range of coefficient of thermal expansion has been determined so that the substrate will be applicable to as wide a variety of materials of component parts as possible. It has been found that the coefficient of thermal expansion should preferably be within a range from $+62 \times 10^{-7}/°$ C. to $+130 \times 10^{-7}/°$ C. within a temperature range from $-50°$ C. to $+70°$ C.

As to specific gravity, recording density of a magnetic information storage medium and data transfer rate are now remarkably improved and there is a growing tendency toward a high speed rotation of the magnetic information storage medium. For coping with this tendency, a material for a substrate must be one which can prevent vibration of a disk caused by deflection of the substrate during high speed rotation to the maximum extent possible. Specific gravity is one of factors which relate to the vibration of the disk. If specific gravity of the substrate exceeds 2.8, there is a remarkable tendency toward vibration caused by the mass of the substrate itself during high speed rotation, though it depends upon the number of rotation. On the other hand, if specific gravity is below 2.2, it is advantageous for the mass of the disk substrate during high speed rotation but the composition for realizing this specific gravity is limited and it is difficult to satisfy other physical properties with this limited composition. Having regard to balance with various physical properties, the specific gravity should be within a range from 2.2 to 2.8. For coping with high speed rotation, a preferable range of the specific gravity is from 2.2 to 2.6 and a more preferable range thereof is from 2.3 to 2.5.

Young's modulus can be mentioned as a desirable property for preventing vibration of the disk during high speed rotation. If Young's modulus is high, vibration of the disk during high speed rotation can be prevented and, for this reason, Young's modulus should at least be 80 GPa As to the upper limit, a higher Young's modulus is preferable from the standpoint of preventing vibration but an excessively high Young's modulus requires a large specific gravity for realizing it and such large specific gravity will be outside of the above described preferable range and, moreover, processability of the substrate will be significantly reduced. For this reason, the upper limit of Young's modulus should be 150 GPa. Having regard to the balance between prevention of vibration and processability, Young's modulus should preferably be within a range from 90 GPa to 130 GPa and more preferably be within a range from 95 GPa to 120 GPa.

As described above, Young's modulus and specific gravity are important factors for preventing vibration during high speed rotation of the disk. As a result of further study of this balance, it has been found that there is a preferable range in the ratio between Young's modulus and specific gravity. More specifically, the above described requirement can be cleared if the ratio of Young's modulus(GPa)/specific gravity is within a range from 37 to 50 and if this ratio is within a range from 40 to 50, matching at a higher level can be realized.

Description will now be made about Vickers hardness. There is a remarkable increase in portable type information devices such as mobile computers. In a storage medium used for this type of device and a storage medium of a removable type, a certain surface hardness is required in addition to mechanical strength for preventing vibration so that the storage medium can stand a shock caused when it is carried by the user. For satisfying such requirement, Vickers hardness should be 4.5 GPa or over. Since an excessively high hardness reduces processability of the substrate, the upper limit should be 15 GPa. A preferable range of Vickers hardness is from 4.7 GPa to 12 GPa and a more preferable range thereof is from 4.9 GPa to 10 GPa.

Reasons why the substrate does not substantially contain $Na_2O$ and PbO will now be described. $Na_2O$ in a material causes problems in producing a high precision and fine-grained magnetic film. If the substrate contains this ingredient, diffusion of Na ion into the magnetic film occurs during the film forming process and this makes the magnetic film grains to become coarse and deteriorates orientation with resulting deterioration in the magnetic property. Further, the diffusion of the Na ion into the magnetic film adversely affects a long-term stability of the magnetic property. The substrate should also be free of PbO which is undesirable from the standpoint of environment protection.

Since the glide height of the magnetic head is reduced to 0.025 μm or below with improvement of recording density on the magnetic information storage medium, the data zone on the disk surface is required to have a surface roughness (Ra) of 3 Å to 9 Å which enables this glide height. If the surface roughness is larger than this, the magnetic head of a low glide height collides with the storage medium resulting in damage to the magnetic head or the storage medium which will disable inputting and outputting of data.

As to the grain diameter of the grown crystal grains, the crystal grain diameter of the crystal phase is an important factor for obtaining a glass-ceramic having the above described super-flatness (3 Å to 9 Å in the data zone). If the crystal grain diameters of the respective crystal phases are outside of the ranges defined above, a desired surface roughness cannot be obtained. As to the shape of the crystal phases, the crystal phase should preferably be grown as globular grains for obtaining a relatively large surface roughness within the above described range of surface roughness. The globular grains of the crystal phase are exposed on the surface of the substrate after polishing and thereby realize an excellent surface which is flat and has no flash. If it is desired to obtain a relatively small surface roughness within the above described range of surface roughness, it is preferable to have fine crystal grains distributed uniformly.

Reasons for limiting the composition range of the base glass as defined in the claims will now be described.

The $SiO_2$ ingredient is a very important ingredient for growing lithium disilicate ($Li_2O.2SiO$), quartz ($SiO_2$), quartz solid solution ($SiO_2$ solid solution), cristobalite ($SiO_2$) and cristobalite solid solution ($SiO_2$ solid solution) as predominant crystal phases by heat treating the base glass. If the amount of this ingredient is below 70%, the grown crystals of the glass-ceramic become instable and those grains tend to become coarse. If the amount of this ingredient exceeds 80%, difficulty arises in melting and forming of the glass.

The $Li_2O$ ingredient is a very important ingredient for growing lithium disilicate ($Li_2O.2SiO_2$) as a predominant crystal phase by heat treating the base glass. If the amount of this ingredient is below 9%, difficulty arises in growing of this crystal phase and also in melting of the base glass. If the amount of this ingredient exceeds 12%, the grown crystals become instable and those grains tend to become coarse and its chemical durability is deteriorated.

The $K_2O$ ingredient improves the melting property of the glass and prevents the grown crystals from becoming too coarse. If the amount of this ingredient is below 2%, these effects cannot be achieved whereas if the amount of this ingredient exceeds 5%, it will cause coarseness of the grown crystals, change in the crystal phase and deterioration in chemical durability. Having regard to the balance of these factors, a preferable range of this ingredient is 3% to 5%.

The MgO and ZnO ingredients are effective for enabling the crystal grains of lithium disilicate ($Li_2O.2SiO_2$) to grow in a globular shape, enabling crystal grains of quartz ($SiO_2$) and quartz solid solution ($SiO_2$ solid solution) to grow in a globular shape consisting of aggregated particles, and enabling cristobalite ($SiO_2$) and cristobalite solid solution ($SiO_2$ solid solution) to grow in a globular shape. For these purposes, the MgO ingredient may be added up to 5% and the ZnO ingredient may be added up to 3% and the total amount of the MgO and ZnO ingredients up to 5% may be added. If the amount of the MgO ingredient exceeds 5%, the amount of the ZnO ingredient exceeds 3% and the total amount of the MgO and ZnO ingredients exceeds 5%, growth of a desired crystal phase becomes difficult. For obtaining the respective crystals in a globular shape, the amount of the MgO ingredient should preferably be 0.5% to 5%. Likewise, the amount of the ZnO ingredient should preferably be 0.2% to 3% and, more preferably, 1% to 2.5%. The total amount of the MgO and ZnO ingredients should preferably be 1.2% to 5%.

The $P_2O_5$ ingredient is indispensable as a nucleating agent. For enhancing forming of nucleus and preventing the grown crystal grains from becoming too coarse, the amount of this ingredient should be 1.5% or over. For preventing opaque devitrification of the base glass and maintaining stable large scale production, the amount of this ingredient should be 3% or below.

The $ZrO_2$ ingredient is an important ingredient which, in addition to the functions, like the $P_2O_5$ ingredient, as a nucleating agent, is effective for making the grown crystals fine, improving the mechanical strength and improving the chemical durability. If the amount of this ingredient is below 0.5%, these effects cannot be achieved. If the amount of this ingredient exceeds 5%, difficulty arises in melting of the base glass and $ZrSiO_4$ and the like slug are left unmelted.

The $Al_2O_3$ ingredient is effective for improving the chemical durability and hardness of the glass-ceramic. If the amount of the $Al_2O_3$ ingredient is below 2%, these effects cannot be achieved whereas if the amount of this ingredient is 10% or over, melting property and resistivity to devitrification are deteriorated, and the grown crystal phase changes to β-spodumene ($Li_2O.Al_2O_3.4SiO$) of a low thermal expansion characteristic. Since growth of β-spodumene significantly decreases the coefficient of thermal expansion of the material, growth of such crystal should be avoided. A smaller content of $Al_2O_3$ expands the tolerance of the heat treating conditions in which β-spodumene is not grown, though it depends upon the heat treating condition and, therefore, a preferable range of this ingredient is 2% to 8% and the most preferable range of this ingredient which does not cause β-spodumene to be produced regardless of the heat treating condition is 2% to 6%.

The $Sb_2O_3$ and $As_2O_3$ ingredients may be added as a refining agent in melting the base glass. Addition of these ingredients in the total amount up to 2% and, preferably up to 1%, will suffice.

Additionally, a substrate material is required to be free from defects such as crystal anisotropy, foreign matters and impurities, have a fine and uniform grains and further have mechanical strength, a high Young's modulus and surface hardness which can sufficiently stand a high speed rotation and contact with a magnetic head and a portable use such as a removable storage medium. Such requirements are all satisfied by the glass-ceramic substrate of the present invention.

For manufacturing the glass-ceramic substrate for a magnetic information storage medium according to the invention, glass materials of the above-described composition are melted and are subjected to a hot or cold forming process. The formed glass is subjected to heat treatment under a temperature within a range from 450° C. to 550° C. for one to twelve hours for nucleation and then is subjected to further heat treatment under a temperature within a range from 680° C. to 800° C. for one to twelve hours for crystallization.

The predominant crystal phase of the glass-ceramic thus obtained is at least one crystal phase selected from the group consisting of lithium disilicate ($Li_2O.2SiO_2$), quartz ($SiO_2$), quartz solid solution ($SiO_2$ solid solution), cristobalite ($SiO_2$) and cristobalite solid solution ($SiO_2$ solid solution). The crystal grains of lithium disilicate have a globular shape and have a diameter within a range from 0.05 μm to 0.30 μm. The crystal grains of cristobalite and cristobalite solid solution have a globular shape and have a diameter within a range from 0.10 μm and 0.50 μm. The crystal grains of quartz and quartz solid solution have a globular grain shape consisting of aggregated particles and have a diameter within a range from 0.10 μm and 1.00 μm.

The glass-ceramic subsequently is lapped and polished in a conventional manner to provide a glass-ceramic substrate for a magnetic information storage medium having a surface roughness (Ra) within a range from 3 Å to 9 Å.

EXAMPLES

Examples of the present invention will now be described.

Table 1 shows temperatures for melting raw materials in manufacturing each glass and glass-ceramics. Tables 2 to 5 show examples (No. 1 to No. 10) of compositions of the glass-ceramics substrate for a magnetic information storage medium made according to the invention and compositions of the two prior art $Li_2O$—$SiO_2$ system glass-ceramics disclosed in Japanese Patent Application Laid-open Publication No. Sho 62-72547 (Comparative Example 1) and Japanese Patent Application Laid-open Publication No. Hei 9-35234 (Comparative Example 2) together with the temperature of nucleation, temperature of crystallization, crystal phase, crystal grain diameter, crystal grain shape and surface roughness (Ra) of the data zone after polishing. In Tables 2 to 5, lithium disilicate is abbreviated as "LD", quartz and quarts solution as "QU", cristobalite and cristobalite solution as "CR" and the globular shape of aggregated particles as "glob. agg" respectively.

TABLE 1

| Classification by composition system | Melting temperature of glass (° C.) |
|---|---|
| $Al_2O_3$-$SiO_2$ glass | 800–900 |
| MgO-$Al_2O_3$-$SiO_2$ glass-ceramics | 1300–1400 |
| ZnO-$Al_2O_3$-$SiO_2$ glass-ceramics | 1250–1350 |
| $Li_2O$-$Al_2O_3$-$SiO_2$ glass-ceramics | 1300–1400 |
| Glass-ceramics of the present invention | 950–1150 |

TABLE 2

| | Examples | | |
|---|---|---|---|
| Ingredients (weight %) | 1 | 2 | 3 |
| $SiO_2$ | 76.5 | 76.5 | 76.5 |
| $Li_2O$ | 10.5 | 10.5 | 10.5 |
| $P_2O_5$ | 2.3 | 2.3 | 2.3 |
| $ZrO_2$ | 1.9 | 1.9 | 1.9 |
| $Al_2O_3$ | 3.5 | 3.5 | 3.5 |
| MgO | 0.8 | 0.8 | 0.8 |
| ZnO | 0.5 | 0.5 | 0.5 |
| $K_2O$ | 3.8 | 3.8 | 3.8 |
| $Sb_2O_3$ | 0.2 | 0.2 | 0.2 |
| Nucleation temperature (° C.) | 540 | 540 | 540 |
| Crystallization temperature (° C.) | 730 | 760 | 780 |
| Predominant crystal phase | LD | LD | LD |
| Grain diameter (average, μm) | 0.1 | 0.1 | 0.1 |
| Crystal grain shape | globular | globular | globular |
| Predominant crystal phase | | CR | CR |
| Grain diameter (average, μm) | | 0.3 | 0.3 |
| Crystal grain shape | | globular | globular |
| Predominant crystal phase | | | QU |
| Grain diameter (average, μm) | | | 0.3 |
| Crystal grain shape | | | glob. agg |
| Coefficient of thermal expansion ($\times 10^{-7}$/° C.) ($-50°$ C.–$+70°$ C.) | 62 | 70 | 76 |
| Young's modulus (GPa) | 85 | 90 | 120 |
| Vickers hardness (GPa) | 7 | 9 | 12 |
| Specific gravity | 2.35 | 2.40 | 2.50 |
| Surface roughness (Ra) (Å) | 3 | 4 | 8 |

TABLE 3

| | Examples | | |
|---|---|---|---|
| Ingredients (weight %) | 4 | 5 | 6 |
| $SiO_2$ | 75.9 | 76.5 | 76.8 |
| $Li_2O$ | 10.5 | 10.5 | 10.5 |
| $P_2O_5$ | 2.5 | 2.3 | 2.0 |
| $ZrO_2$ | 2.5 | 2.0 | 1.9 |
| $Al_2O_3$ | 3.5 | 3.5 | 3.5 |
| MgO | 0.6 | 1.0 | 0.8 |
| ZnO | 0.5 | 0.5 | 0.5 |
| $K_2O$ | 3.8 | 3.5 | 3.8 |
| $Sb_2O_3$ | 0.2 | 0.2 | 0.2 |
| Nucleation temperature (° C.) | 540 | 540 | 540 |
| Crystallization temperature (° C.) | 770 | 760 | 780 |
| Predominant crystal phase | LD | LD | LD |
| Grain diameter (average, μm) | 0.1 | 0.1 | 0.1 |
| Crystal grain shape | globular | globular | globular |
| Predominant crystal phase | CR | CR | CR |
| Grain diameter (average, μm) | 0.3 | 0.3 | 0.3 |
| Crystal grain shape | globular | globular | globular |
| Predominant crystal phase | | | QU |
| Grain diameter (average, μm) | | | 0.3 |
| Crystal grain shape | | | glob. agg |
| Coefficient of thermal expansion ($\times 10^{-7}$/° C.) ($-50°$ C.–$+70°$ C.) | 72 | 74 | 79 |
| Young's modulus (GPa) | 111 | 100 | 142 |
| Vickers hardness (GPa) | 10 | 8 | 12 |
| Specific gravity | 2.55 | 2.47 | 2.55 |
| Surface roughness (Ra) (Å) | 3 | 6 | 9 |

TABLE 4

| | Examples | | |
|---|---|---|---|
| Ingredients (weight %) | 7 | 8 | 9 |
| $SiO_2$ | 76.0 | 76.5 | 76.5 |
| $Li_2O$ | 11.0 | 10.0 | 10.5 |
| $P_2O_5$ | 2.0 | 2.3 | 2.4 |
| $ZrO_2$ | 1.9 | 1.9 | 1.5 |

TABLE 4-continued

| | Examples | | |
|---|---|---|---|
| Ingredients (weight %) | 7 | 8 | 9 |
| $Al_2O_3$ | 3.8 | 3.5 | 3.5 |
| MgO | 1.0 | 1.3 | 0.8 |
| ZnO | 0.3 | 0.5 | 0.8 |
| $K_2O$ | 3.8 | 3.8 | 3.8 |
| $Sb_2O_3$ | 0.2 | 0.2 | 0.2 |
| Nucleation temperature (° C.) | 540 | 530 | 540 |
| Crystallization temperature (° C.) | 750 | 740 | 780 |
| Predominant crystal phase | LD | LD | LD |
| Grain diameter (average, μm) | 0.1 | 0.1 | 0.1 |
| Crystal grain shape | globular | globular | globular |
| Predominant crystal phase | | CR | |
| Grain diameter (average, μm) | | 0.1 | |
| Crystal grain shape | | globular | |
| Predominant crystal phase | | QU | QU |
| Grain diameter (average, μm) | | 0.3 | 0.2 |
| Crystal grain shape | | glob. agg | glob. agg |
| Coefficient of thermal expansion (×10⁻⁷/° C.) (−50° C.→+70° C.) | 65 | 67 | 78 |
| Young's modulus (GPa) | 110 | 122 | 125 |
| Vickers hardness (GPa) | 7 | 7 | 9 |
| Specific gravity | 2.41 | 2.48 | 2.50 |
| Surface roughness (Ra) (Å) | 3 | 4 | 9 |

TABLE 5

| | Examples | Comparative Examples | |
|---|---|---|---|
| Ingredients (weight %) | 10 | 1 | 2 |
| $SiO_2$ | 76.0 | 80.0 | 73.5 |
| $Li_2O$ | 10.5 | 8.2 | 13.5 |
| $P_2O_5$ | 2.5 | 2.5 | 2.3 |
| $ZrO_2$ | 2.2 | $Na_2O$ 1.0 | 1.9 |
| $Al_2O_3$ | 3.4 | 3.0 | 3.5 |
| MgO | 0.9 | | 0.8 |
| ZnO | 0.4 | 1.0 | 0.5 |
| $K_2O$ | 3.9 | 3.5 | 3.8 |
| $Sb_2O_3$ | 0.2 | 0.3 | 0.2 |
| Nucleation temperature (° C.) | 560 | 540 | 540 |
| Crystallization temperature (° C.) | 770 | 800 | 780 |
| Predominant crystal phase | LD | LD | LD |
| Grain diameter (average, μm) | 0.1 | 1.5 | 1.0 |
| Crystal grain shape | globular | acicular | globular |
| Predominant crystal phase | CR | CR | CR |
| Grain diameter (average, μm) | 0.3 | 0.3 | 0.3 |
| Crystal grain shape | globular | globular | globular |
| Predominant crystal phase | QU | | |
| Grain diameter (average, μm) | 0.3 | | |
| Crystal grain shape | glob. agg | | |
| Coefficient of thermal expansion (×10⁻⁷/° C.) (−50° C.→+70° C.) | 75 | 60 | 61 |
| Young's modulus (GPa) | 120 | 80 | 80 |
| Vickers hardness (GPa) | 12 | 6 | 7 |
| Specific gravity | 2.58 | 2.48 | 2.45 |
| Surface roughness (Ra) (Å) | 4 | 12 | 11 |

For manufacturing the glass-ceramic substrate of the above described examples, materials including oxides, carbonates and nitrates are mixed and molten in conventional melting apparatus at a temperature within the range from about 1350° C. to about 1450° C. The molten glass is stirred to homogenize it and thereafter formed into a disk shape and annealed to provide a formed glass. Then, the formed glass is subjected to heat treatment to produce the crystal nucleus under a temperature within the range from 450° C. to 550° C. for about one to twelve hours and then is further subjected to heat treatment for crystallization under a temperature within the range from 680° C. to 800° C. for about one to twelve hours to obtain a desired glass-ceramic. Then, this glass-ceramic is lapped with lapping grains having an average grain diameter ranging from 5 μm to 30 μm for about 10 minutes to 60 minutes and then is finally polished with a cerium oxide having grain diameter ranging from 0.5 μm to 2 μm for about 30 minutes to 60 minutes. Then the polished glass-ceramic substrate is rotated in the fixed $CO_2$ laser irradiation system and pulse laser is irradiated onto the substrate to form projections and/or depressions on the landing zone of the substrate.

Figure 6:
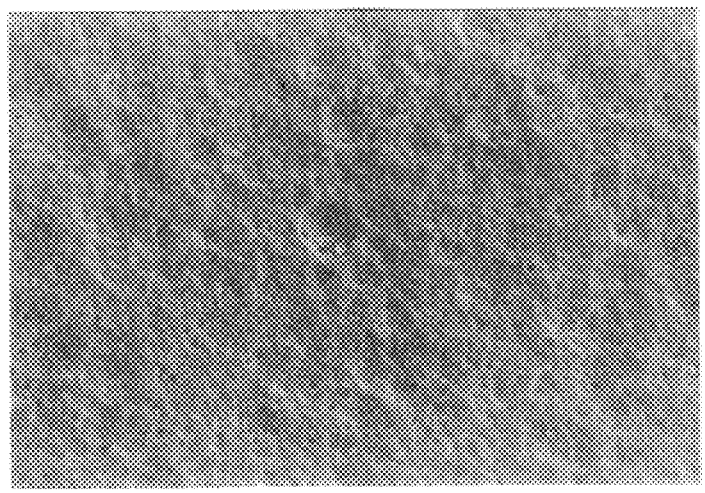
FIG. 6 is an SEM (scanning electron microscope) image of the crystal structure of the glass-ceramic of Example 2 of the present invention after HF etching.
Figure 7:
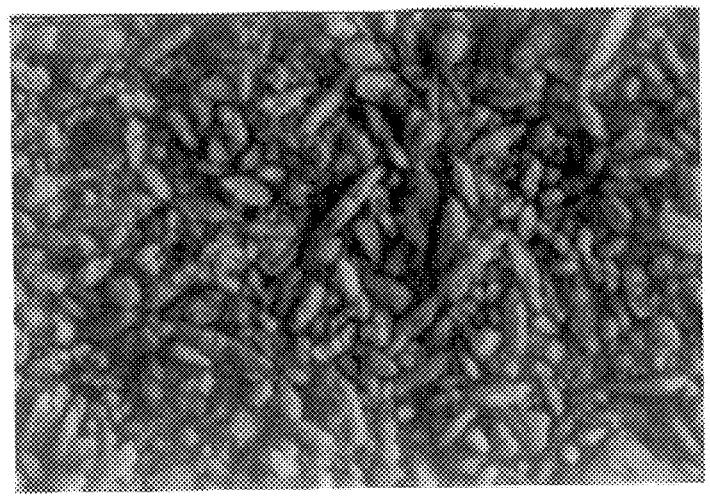
FIG. 7 is an SEM image of the crystal structure of the prior art glass-ceramic (Comparative Example 1) after HF etching.
Figure 8:
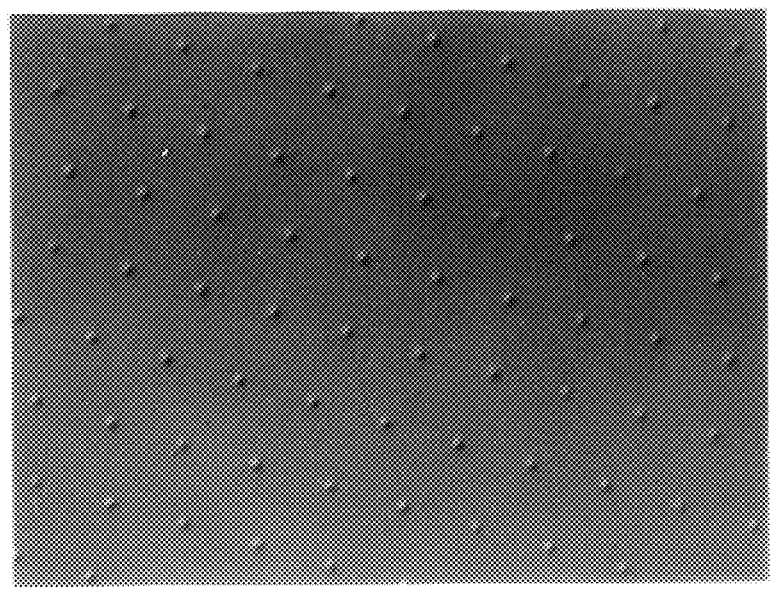
FIG. 8 is an SEM image of projections and depressions of the glass-ceramic of Example 3 of the present invention after irradiation of $CO_2$ laser.
Figure 9:
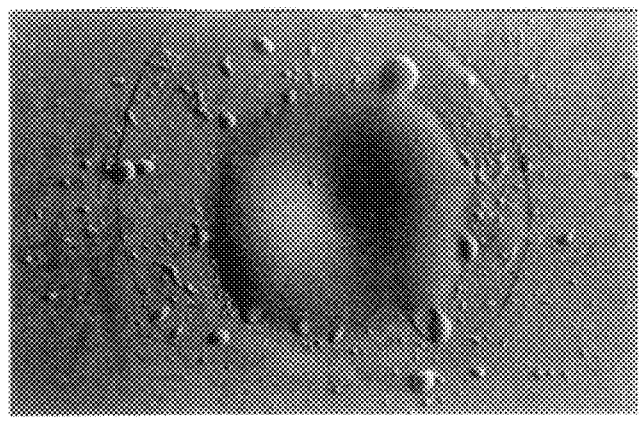
FIG. 9 is an SEM image of projections and depressions of the conventional alumino-silicate tempered glass after irradiation of $CO_2$ laser.

The crystal shapes of Example 1 and Comparative Example 1 are shown in FIGS. 6 and 7. FIG. 6 is an SEM image showing the grain structure of the glass-ceramic of Example 1 after HF etching and FIG. 7 is an SEM image showing the grain structure of the glass-ceramic of Comparative Example 1 after HF etching. FIG. 8 is an SEM image showing projections and/or depressions of the glass-ceramic of Example 3 after irradiation of $CO_2$ laser. FIG. 9 is an SEM image showing projections and depressions of the conventional alumino-silicate tempered glass after irradiation of $CO_2$ laser.

As shown in Tables 2 to 5 and FIGS. 6 and 7, the glass-ceramics of the present invention are different from the comparative examples of the prior art $Li_2O \cdot SiO_2$ system glass-ceramics in the crystal grain diameter and crystal grain shape. In the glass-ceramics of the present invention, a predominant crystal phase or phases which is at least one crystal phase selected from the group consisting of lithium disilicate ($Li_2O \cdot 2SiO_2$), quartz ($SiO_2$), quartz solid solution ($SiO_2$ solid solution), cristobalite ($SiO_2$) and cristobalite solid solution ($SiO_2$ solid solution) has crystal grains which are fine globular grains. Whereas in the glass-ceramic of Comparative Example 1, the lithium disilicate crystal phase has an acicular shape and has a large grain diameter of 1.0 μm or over. In view of the current tendency toward the super flatness, the glass-ceramics of the comparative examples will cause difficulty in the surface roughness after polishing and cause other defects. The glass-ceramics of Comparative Examples 1 and 2 have surface roughness Ra of 11 Å and over which shows that it is extremely difficult in the comparative examples to obtain an excellent flat surface characteristic required.

The glass-ceramic of Comparative Example 2 contains β-cristobalite as a predominant crystal phase but has a large grain diameter and hence a large surface roughness (Ra). Moreover, it has a coefficient of thermal expansion of 61 which is outside of the range defined in the present invention. For these reasons, an excellent matching between the magnetic information storage medium and the magnetic information storage device cannot be secured.

On the glass-ceramic substrates of the above described examples are formed films of a Cr intermediate layer (80 nm), a Co-Cr magnetic layer (50 nm) and a SiC protective layer (10 nm) by the DC sputtering method. Then, a perfluoropolyether lubricant (5 nm) is coated over the formed film to provide a magnetic information storage medium. The magnetic information storage medium thus obtained can reduce the glide height as compared to the prior art magnetic information storage medium owing to its excellent super flatness. Further, the magnetic information storage medium of the invention can be used for the information storage device of the ramp loading system in which the magnetic head performs inputting and outputting of signals in contact with the surface of the information storage medium without damaging the head or medium.

An example of the glass-ceramic substrate for a magnetic information storage medium according to the invention is shown in FIG. 1. A substrate 1 has a landing zone 3 formed about a central opening 5 and a data zone 2 formed adjacent to the outer periphery of the landing zone 3. The reference character 4 designates an area called "ring".

Figure 2:
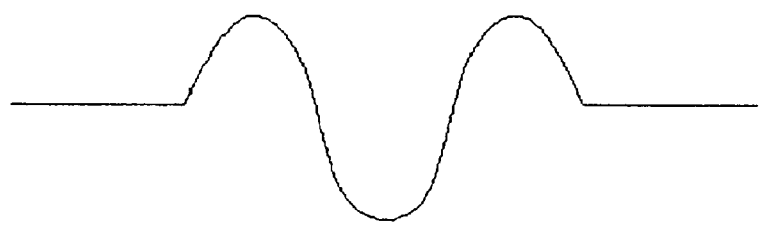
FIG. 2 is a sectional view of projections and depressions formed in the landing zone.
Figure 3:
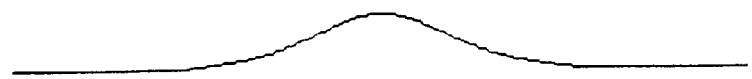
FIG. 3 is a sectional view of projections formed in the landing zone.
Figure 4:
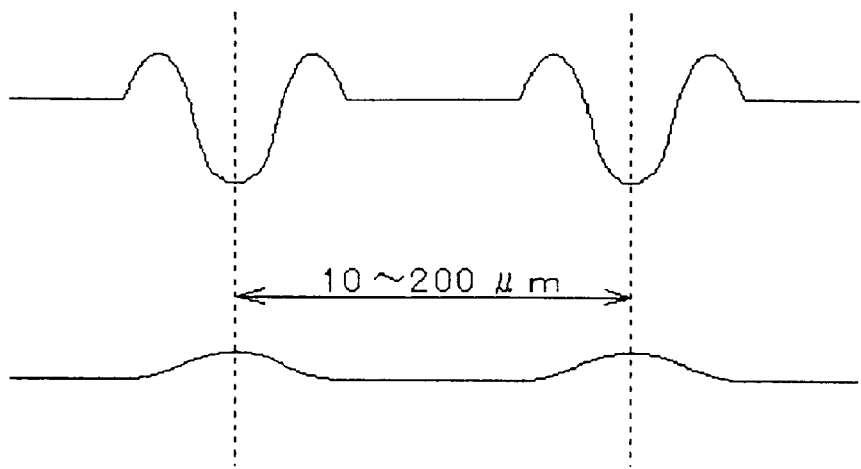
FIG. 4 is a sectional view showing height of projections and depressions or projections formed in the landing zone.
Figure 5:
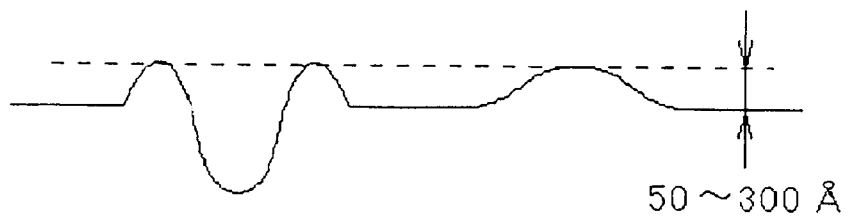
FIG. 5 is a sectional view showing height of projections and depressions or projections formed in the landing zone.

An example of projections and/or depressions formed in the landing zone and an example of a projection formed in the landing zone are shown in FIGS. 2 and 3. An example of interval and height of projections and/or depressions is shown in FIG. 4 and another example of height of projections is shown in FIG. 5.

FIG. 10 shows a magnetic information storage device using the landing zone system in which start and stop of a magnetic head are performed in the landing zone. FIG. 11 shows a magnetic information storage device using the ramp loading system in which start and stop of the magnetic head are performed in an area outside of the magnetic information storage medium.

What is claimed is:

1. A glass-ceramic substrate for a magnetic information storage medium comprising, as a predominant phase or phases, at one crystal phase selected from the group consisting of lithium disilicate ($Li_2O.2SiO_2$, having an interplanar spacing of maximum peak intensity measured by an X-ray diffraction analysis within a range from 3.57 Å and 3.62 Å), quartz ($SiO_2$ having an interplanar spacing of maximum peak intensity measured by an X-ray diffraction analysis within a range for 3.33 Å to 3.41 Å), quartz solid solution ($SiO_2$) solid solution, having an interplanar spacing of maximum peak intensity measured by an X-ray diffraction analysis within a range from 3.33 Å to 3.41 Å), cristobalite ($SiO_2$, having an interplanar spacing of maximum peak intensity measured by an X-ray diffraction analysis within a range from 4.04 Å to 4.14 Å) and cristobalite solid solution ($SiO_2$) solid solution, having an interplanar spacing of maximum peak intensity measured by an X-ray diffraction analysis within a range form 4.04 Å to 4.14 Å), has a coefficient of thermal expansion within a range from $+62\times10^{-7}/°$ C. to $+130\times10^{-7}/°$ C. in a temperature range from $-50°$ C. to $+70°$ C., has a Young's modulus within a range from 80 GPa to 150 GPa, has Vickers hardness within a range from 4.5 GPa to 15.0 GPa, has a specific gravity within a range from 2.2 to 2.8, has a surface roughness (Ra) after polishing within a range from 3 Å to 9 Å and contains $Al_2O_3$ in the amount of 2% to less than 10% and $ZrO_2$ in the amount of 0.5% to 5% wherein said glass-ceramic substrate has a composition which comprises in weight percent:

| | |
|---|---|
| $SiO_2$ | 70–80% |
| $Li_2O$ | 9–12% |
| $K_2O$ | 2–5% |
| MgO + ZnO | 0–5% |
| in which MgO | 0–5% |
| ZnO | 0–3% |
| $P_2O_5$ | 1.5–3% |
| $ZrO_2$ | 0.5–5% |
| $Al_2O_3$ | 2–less than 10% |
| $Sb_2O_3 + As_2O$ | 0–2%. |

2. A glass-ceramic substrate as defined in claim 1 which is substantially free of $Na_2O$ and PbO.

3. A glass-ceramic substrate as defined in claim 1 wherein crystal grain diameter of lithium disilicate is within a range from 0.05 μm to 0.30 μm, crystal grain diameter of quartz and quartz solid solution is within a range from 0.10 μm to 1.00 μm and crystal grain diameter of cristobalite and cristobalite solid solution is within a range from 0.10 μm and 0.50 μm.

4. A glass-ceramic substrate as defined in claim 1 obtained by heat treating a base glass for nucleation under a temperature within a range from 450° C. to 550° C. for one to twelve hours and further heat treating the glass for crystallization under a temperature within a range from 680° C. to 800° C. for one to twelve hours and thereafter polishing the glass-ceramic to a surface roughness (Ra) within a range from 3 Å to 9 Å.

5. A magnetic information storage medium provided by forming a magnetic film and, if necessary, other layers including an undercoat layer, a protective layer and a lubricating layer, on a glass-ceramic substrate as defined in claim 1.

6. A glass-ceramic substrate for a magnetic information storage medium comprising, as a predominant phase or phases, at least one crystal phase selected from the group consisting of lithium disilicate ($Li_2O.2SiO_2$, having an interplanar spacing of maximum peak intensity measured by an X-ray diffraction analysis within a range from 3.57 Å and 3.62 Å), quartz ($SiO_2$ having an interplanar spacing of maximum peak. intensity measured by an X-ray diffraction analysis within a range for 3.33 Å to 3.41 Å), quartz solid solution ($SiO_2$) solid solution, having an interplanar spacing of maximum peak intensity measured by an X-ray diffraction analysis within a range from 3.33 Å to 3.41 Å), cristobalite ($SiO_2$, having an interplanar spacing of maximum peak intensity measured by an X-ray diffraction analysis within a range from 4.04 Å to 4.14 Å) and cristobalite solid solution ($SiO_2$) solid solution, having an interplanar spacing of maximum peak intensity measured by an X-ray diffraction analysis within a range form 4.04 Å to 4.14 Å), has a coefficient of thermal expansion within a range from $+62\times10^{-7}/°$ C. to $+130\times10^{-7}/°$ C. in a temperature range from $-50°$ C. to $+70°$ C., has Young's modulus within a range from 80 GPa to 150 GPa, has Vickers hardness within a range from 4.5 GPa to 15.0 GPa, has a specific gravity within a range from 2.2 to 2.8, has a surface roughness (Ra) after polishing within a range from 3 Å to 9 Å and contains $Al_2O_3$ in the amount of 2% to less than 10% and $ZrO_2$ in the amount of 0.5% to 5% wherein said glass-ceramic substrate has a composition which consists essentially of in weight percent:

| | |
|---|---|
| $SiO_2$ | 70–80% |
| $Li_2O$ | 9–12% |
| $K_2O$ | 2–5% |
| MgO + ZnO | 0–5% |
| in which MgO | 0–5% |
| ZnO | 0–3% |
| $P_2O_5$ | 1.5–3% |
| $ZrO_2$ | 0.5–5% |
| $Al_2O_3$ | 2–less than 10% |
| $Sb_2O_3 + As_2O$ | 0–2%. |

\* \* \* \* \*